No. 607,786. Patented July 19, 1898.
G. E. WHITNEY.
COVERING FOR DRIVE CHAINS.
(Application filed Jan. 20, 1897.)
(No Model.) 2 Sheets—Sheet 1.
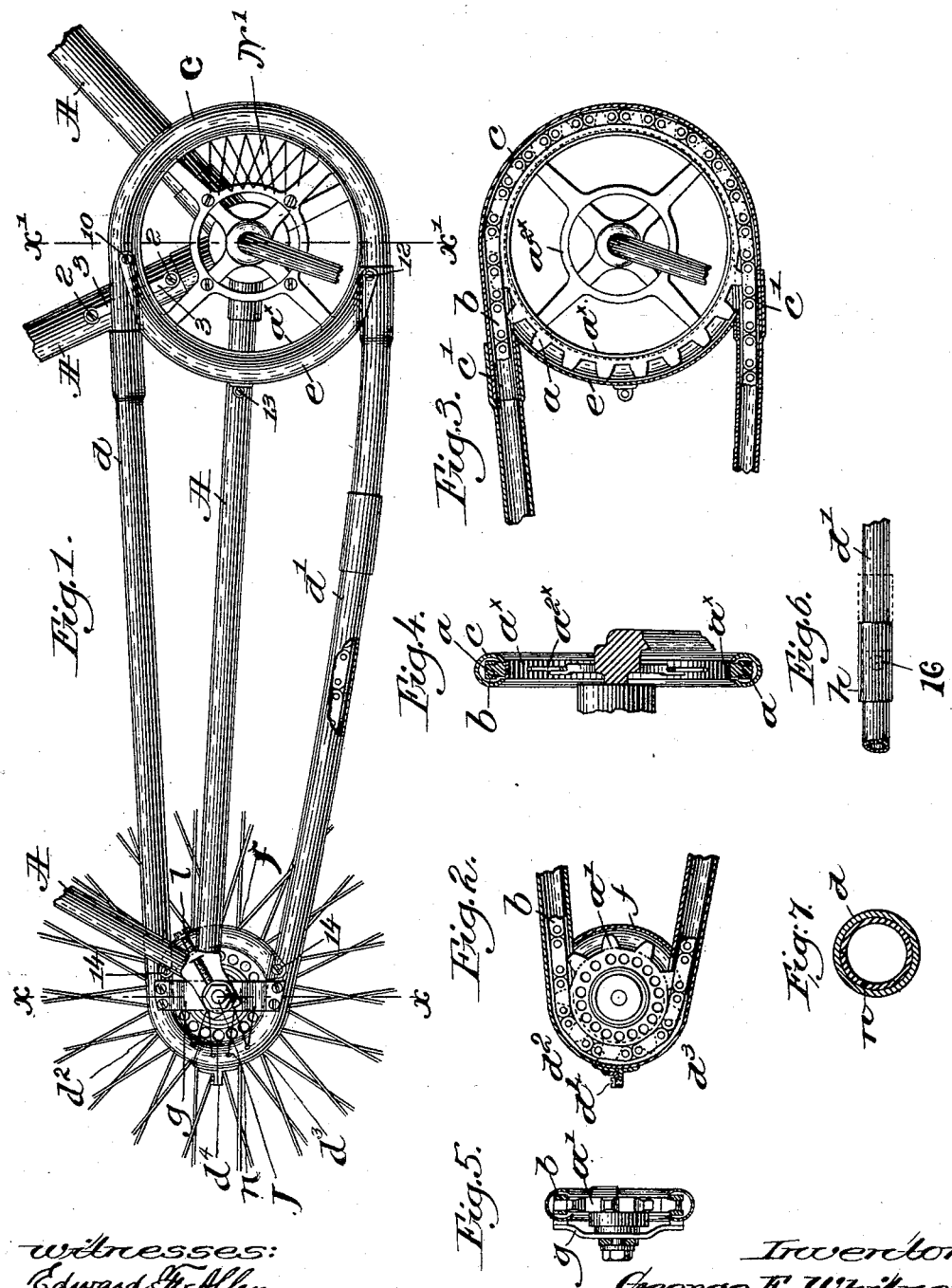

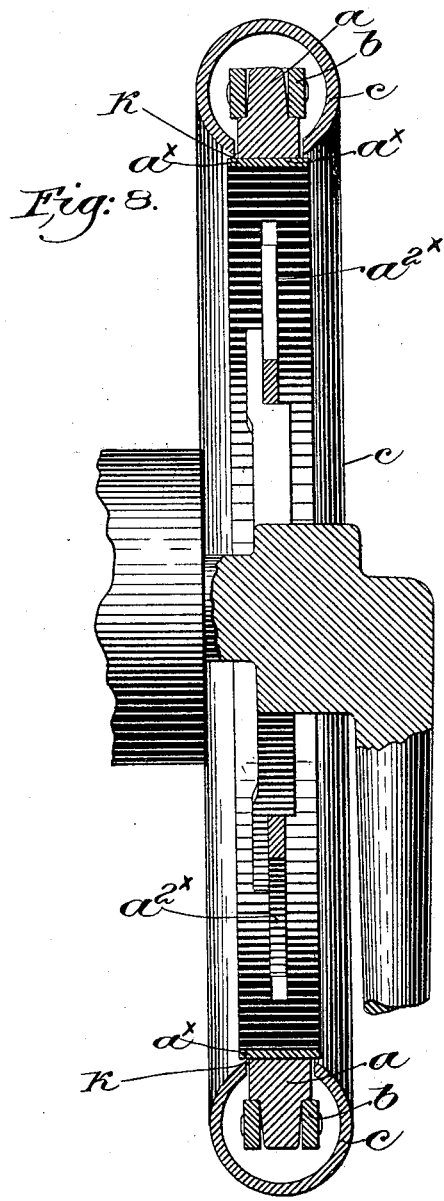

UNITED STATES PATENT OFFICE.

GEORGE E. WHITNEY, OF BOSTON, MASSACHUSETTS, ASSIGNOR TO THE WHITNEY BICYCLE IMPROVEMENT COMPANY, OF KITTERY, MAINE.

COVERING FOR DRIVE-CHAINS.

SPECIFICATION forming part of Letters Patent No. 607,786, dated July 19, 1898.

Application filed January 20, 1897. Serial No. 619,895. (No model.)

*To all whom it may concern:*

Be it known that I, GEORGE E. WHITNEY, of Boston, in the county of Suffolk and State of Massachusetts, have invented an Improvement in Coverings for Driving-Chains for Use with Bicycles and Motor-Carriages, of which the following description, in connection with the accompanying drawings, is a specification, like letters and figures on the drawings representing like parts.

In the use of bicycles and motor-vehicles wherein an endless driving member, such as an endless chain, is used in connection with a coöperating wheel, as a sprocket-wheel, to transmit the power from the driving to the driven sprocket-wheel the chain the sprockets, and the peripheries or rims of the sprocket-wheels should be protected and lubricated in order that the parts may work easily and smoothly, for if any of such parts be left unprotected and accessible to dust the lubricant used thereon soon becomes clogged with dust and dirt and the power required to drive the machine is increased materially. If the protective covering of the said operative parts be not sufficiently tight to permanently retain the lubricant, the latter must frequently be renewed at some inconvenience, and what is more important the lubricant leaking out soils the clothes of the rider and spreading itself over other parts of the machine retains any dust or dirt coming in contact with it.

This invention has for its object the production of simple and effective means for protecting and shielding the chain, sprockets, and the rims of the sprocket-wheels from dust and dirt, keeping them perfectly lubricated and especially retaining the lubricant permanently in its proper place, so that it may have the effect desired without frequent renewal.

I am aware that the sprocket-wheels of bicycles have been covered with disk-like boxes having circular openings at the center on each side, which openings were slightly larger than the respective shafts extended through them, and that such circular disk-like boxes so inclosing the sprocket-wheels have had openings near the top and bottom, into which openings have been fitted nozzles or tubes, one covering the upper and one the lower run of the chain between the sprocket-wheels. I am further aware that such and similar constructions have been spoken of as "dirt and oil tight" or "oil-containers;" but it is manifest that in none of them as shown is it possible or feasible to keep any substantial or permanent supply of oil in the covering in all positions of the machine—as, for instance, when the bicycle is laid on its side or inverted to repair a puncture in the tire or to clean the parts, as is frequently the case. In accordance with my invention I run the chain through a tubular or tube-like protective covering, to be hereinafter described, it inclosing all parts of the chain, the sprockets, and the rims or peripheries of the sprocket-wheels, and this covering permanently contains a suitable non-fluid lubricant.

Figure 1, in side elevation, represents a sufficient portion of a bicycle with its chain and sprocket-wheels to be understood with my invention applied thereto. Fig. 2 is a sectional view of the chain-covering in connection with the rear sprocket-wheel; Fig. 3, a like view of the covering in connection with the pedal sprocket-wheel; Fig. 4, a section in substantially the line $x'\ x'$, Fig. 1; Fig. 5, a like section in the line $x\ x$, Fig. 1; Fig. 6, a detail of the tubular covering, showing one way in which the lubricant may be introduced. Fig. 7 is an enlarged section of the tubular covering chiefly to show its non-metallic lining, which is shown in the other figures by merely a thickened black line. Fig. 8 is a sectional view substantially the same as Fig. 4, but enlarged.

In carrying out my invention I take a piece of preferably metal tubing of the proper size and by usual processes bend or shape it into a semicircular or U-shaped form, as shown at $c$, Figs. 1 and 3, the inner circumference thereof being open, such opening being conveniently made by slotting the tube longitudinally, the opening being wide enough to freely admit the rim of the pedal sprocket-wheel, so that the adjacent portion of the tube may span the sides of the rim of the sprocket-wheel without actually touching them. I then fit the U-shaped piece $c$ over the rim of the pedal sprocket-wheel and the chain thereon, as shown in Figs. 1, 3, and 4 and in an enlarged section in Fig. 8, and suitably attach such part of the cover to the frame of the machine, as by a suitable bracket 3 and suitable screws 2. The ends of this U-shaped cover project, as at $c'$ $c'$, (see Fig. 3,) and in this instance they have telescopically connected therewith the ends of two tubes $d$ and $d'$. The other ends of said tubes in this instance of my invention are shown as bent into circular form, as at $d^2$ $d^3$, Figs. 1 and 2, the inner sides of said bent portions having suitably-formed openings therein to embrace the sprockets and sides of the rim of the rear sprocket-wheel $a'$ with the chain upon it. The portions $d^2$ $d^3$ of this cover are suitably united, and as herein shown I provide said portions each with a lug, which is entered by a screw $d^4$, the said portions $d^2$ and $d^3$ constituting a smaller U-shaped tube-like covering for the rear sprocket-wheel.

To protect or cover the portion of the pedal sprocket-wheel which is not engaged by the chain, as at $a$, (see Fig. 3,) I insert a short piece of tube $e$ between the ends $c'$ of the U-shaped portion $c$, bent and having an opening, as above described, to complete the cover for the said sprocket-wheel, the ends of the piece $e$ being properly shaped to embrace the portion $c$ and held in place in a suitable manner, as by the screws 10, 12, and 13. Similarly to completely cover and protect the rear sprocket-wheel, as at $a'$, I bend and fit a second shorter piece of tubing open on its inner side or circumference to make the cover portion $f$, which may in turn be held in place by suitable screws 14 14. The two tubes $d$ $d'$ and the ring-like cover for the rear sprocket-wheel are further connected or braced by a support, shown as a strip of metal $g$, Figs. 1 and 5, screwed to said ring-like cover at the top and bottom and passing diametrically across it, said support having a hole through it at the center to receive the axle of the wheel and to hold centrally and otherwise in place the rear portion of the tubular covering, as shown at $j$ in Fig. 1.

The lower tube $d$ is herein shown as provided with a hole 16 (see Fig. 6) for introduction of the lubricant, which preferably is vaseline, and a ferrule $h$ on the tube may be slid back to uncover the said hole when it is desired to fill the covering with the non-fluid lubricant. The said non-fluid lubricant moving in the covering with the chain the sprockets and the rims of the sprocket-wheels will last for several months without being renewed. The larger part of this lubricant adheres to the chain and travels with it, making it appear like a greasy rope if a part of the covering be cut away so that it may be observed. The non-fluid lubricant has at first a slight tendency to escape in small quantities in the small annular spaces between the sides of the rims of the sprocket-wheels and the edges of the openings at the points $k$ $k$, (shown in the sectional drawing Fig. 8;) but in practice fine particles of dust mix with the small portion of the lubricant thus tending to escape at the points $k$ $k$ and dries or hardens it somewhat in or just outside of the said small openings or spaces between the sides of the rims of the sprocket-wheels and the edges of the opening or slot, thus soon making a greasy seal, which forms a continuous or annular greasy bearing at the sides of the rims of the sprocket-wheels—viz., at the points $k$ $k$ in the section shown in Fig. 8. Thus the non-fluid lubricant is sealed up within the covering, and the curved portions are made tight from within and dust-proof from without. I have found in practice that the non-fluid lubricant is thus so thoroughly sealed within the cover that the chain may be used for a long time without once renewing the lubricant and without any appreciable amount of dust or dirt finding its way into the cover and thus reaching the chain, the sprockets, and the peripheries of the sprocket-wheels, which it is desired to protect and keep lubricated.

In some instances it may be advisable to make use of an auxiliary protection for the annular openings or spaces $k$ $k$, and for this purpose I attach to either or both sprocket-wheels in suitable manner an annular shield or movable member $a^\times$ of the covering, (see Figs. 4 and 8,) projecting beyond the rims of the sprocket-wheels and coöperating with the fixed curved members of the covering, thus serving to further protect the openings $k$ $k$ from the dust, mud, and dirt. The movable member $a^\times$ is preferably placed as near as possible to the edges of the inner circumferential opening at $k$ $k$ without actually touching them. A like shield may, if desired, be put upon the rear sprocket-wheel; but since the latter is removed a considerable distance from the front wheel and the dust, dirt, and mud thrown by the rear wheel is thrown outwardly and away from its center it is not found necessary in practice to add such protection to the rear sprocket-wheel.

When the machine is in operation in the ordinary way, the pull comes upon and the work is performed by that portion of the chain which is engaged in the sprockets of the sprocket-wheels and the upper run of the chain, while the lower run of said chain performs no work, but hangs comparatively loose and with a slight sag. I have therefore slightly bent or sagged that portion $d'$ of the tube-like covering which is intended to receive the lower run of the chain.

To obviate any noise which might result when the chain is out of its proper adjustment, occasioned by the striking of the runs of the chain against the interior of the tubular covering, I prefer to provide the run-receiving portions of the covering with a nonmetallic tubular lining $n$, (see Fig. 7,) it being preferably made by rolling a strip of rawhide into tubular form and drawing it longitudinally through said portions of the covering and riveting it firmly to the interior thereof.

Believing myself to be the first to inclose the runs of the driving-chain in tube-like portions and the peripheries of the sprocket-wheels for their entire circumference in tube-like coverings having inner circumferential openings, as heretofore described, and also believing myself to be the first to provide one or both sprocket-wheels with a movable member to coöperate with the inner circumferential openings of said coverings, to thereby close such openings in the manner described, my invention is not restricted to the exact construction and arrangement of parts as herein shown and described, as it will be obvious that the covering may be variously subdivided and applied to the chain and sprocket-wheels in a somewhat different manner without departing from the spirit and scope of my invention and that the movable member may be varied in shape or construction or in the manner of attachment to the sprocket-wheel.

I have shown the tube-like covering as circular in cross-section; but it may equally well and without departing from my invention be square or of any other irregular cross-section through which the train may travel, and so, also, the covering may be in one or more pieces, the main thing being that the protective covering shall be so shaped as to completely cover the chain, the sprockets, and the rims of the sprocket-wheels in such a manner as to practically permanently retain a non-fluid lubricant placed therein and after a short time to seal the annular openings in the manner above described and to prevent the egress of the non-fluid lubricant or the ingress of the dust and dirt to the parts which it is desired to shield and protect.

This invention possesses further great merit because of its lightness and because it presents but little, if any, more obstruction to the wind, and especially a side wind, than do the chain and sprocket-wheels if left unprotected.

My invention when used upon ladies' bicycles serves as a positive dress-guard, and for ladies' wheels the open spaces between the spokes of the sprocket-wheels may, if desired, be filled with cords or strands of rawhide, as at $n'$, said strands being suitably connected with the movable member $a^\times$, carried by and upon the rims and spokes of the pedal sprocket-wheel, and running substantially against the opening in the tube surrounding and inclosing the parts above described, &c., (see Figs. 3 and 4,) said strands being also connected with the central part $a^{2\times}$ of the sprocket-wheel.

To shield the outer side of the rear sprocket-wheel, the cord or rawhide strands $n$ may, if desired, be interlaced between small staples or projecting eyes on the exterior of the covering and eyelets in the supporting-piece $g$, although with my invention it is believed that it will be found unnecessary to have any further protection than the metal tubing, as above described.

With the telescoping tubes $d\ d'$, which may be readily lengthened or shortened, it is manifest that the chain may be tightened or loosened and so adjusted by the screw $l$ in the usual manner.

I claim—

1. A chain-covering for bicycles and motor-vehicles, comprising portions to inclose the upper and lower runs of the chain, a protective covering member for the driving sprocket-wheel, said member having a longitudinal slot in its portion of smallest diameter, whereby said member may surround and inclose the teeth of the driving sprocket-wheel and the chain thereon substantially from one to the other side of the wheel-rim, the edges of the covering member being turned into close proximity to the sides of the wheel adjacent the bases of the teeth and within the base-line thereof, and nowhere contacting with the sprocket-wheel, substantially as described.

2. A chain-cover for bicycles and motor-vehicles, comprising portions to inclose the upper and lower runs of the chain, a protective covering for the driven sprocket-wheel, an annular tube-like member for the driving sprocket-wheel, having a longitudinal slot in its portion of smallest diameter, whereby said member may surround and inclose the teeth of the said driving sprocket-wheel and the chain thereon, substantially from one to the other side of the wheel-rim adjacent the bases of said teeth, and a movable annular member carried by the driving sprocket-wheel to coöperate with the adjacent fixed annular member of the cover and complete the closure of the circumferential opening therein, substantially as described.

3. A chain-covering for bicycles and motor-vehicles, comprising portions to inclose the upper and lower runs of the chain, and a two-part annular protective covering for the peripheral portion only of the sprocket-wheel, to inclose the chain thereon and the wheel-teeth substantially from their base-line outward and from one to the other side of the wheel-rim, the outermost part of the covering being fixed and the inner part carried by the sprocket-wheel, adjacent the bases of its teeth at or within the base-line thereof and extended at each side of the wheel-rim into close proximity to the edges of and to coöperate with the fixed part of said covering.

4. A protective covering for the endless driving member and the coöperating wheel of a cycle or other vehicle, said covering comprising means to surround and inclose the driving member non-adjacent the wheel, and a connected annular portion transversely surrounding and inclosing the peripheral portion only of the said wheel from one to the other side thereof, and the adjacent part of the driving member thereon, whereby the protective inclosure is confined to the driving member and the immediate engaging portion of the wheel, the edges of said covering being in close proximity to the said wheel.

5. A protective covering for the driving mechanism of a cycle or other vehicle, said covering including an annular portion to inclose the peripheral part only of the rotating member or members of the driving mechanism, whereby the protective inclosure is confined to only such peripheral and immediately adjacent part of the rotative member or members of such mechanism.

In testimony whereof I have signed my name to this specification in the presence of two subscribing witnesses.

GEORGE E. WHITNEY.

Witnesses:
GEORGE B. UPHAM,
ALEX. C. PROUDFIT.